United States Patent
Voorhies

(10) Patent No.: US 6,469,707 B1
(45) Date of Patent: Oct. 22, 2002

(54) METHOD FOR EFFICIENTLY RENDERING COLOR INFORMATION FOR A PIXEL IN A COMPUTER SYSTEM

(75) Inventor: Douglas A. Voorhies, Menlo Park, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 09/487,550

(22) Filed: Jan. 19, 2000

(51) Int. Cl.$^7$ ................................................. G09G 5/02
(52) U.S. Cl. ........................ 345/589; 345/611; 345/614
(58) Field of Search ................................. 345/589, 611, 345/614, 639

(56) References Cited

U.S. PATENT DOCUMENTS 6,128,000 A * 10/2000 Jouppi et al. ................ 345/136

OTHER PUBLICATIONS

Norman P. Jouppi et al., Z3, Proceedings of the 1999 Eurographics/SIGGRAPH workshop hardware Jul. 1999, pp. 85–93.*

* cited by examiner

Primary Examiner—Jeffery Brier
Assistant Examiner—Faranak Fouladi
(74) Attorney, Agent, or Firm—Sawyer Law Group LLP

(57) ABSTRACT

A method and system for efficiently rendering and displaying the color intensity information of a pixel in a computer system is disclosed. The pixel includes a plurality of fragments. The method and system comprises providing a weighted average of a preselected number of the plurality of fragments for a pixel for a plurality of the color intensity information to a first portion of a register. The register is within a data structure in the computer system. The method and system also includes providing the color intensity information of a preselected number of fragments, except the one with the largest coverage to at least one additional portion of the register. The method and system further includes sending the information in the first portion and at least one additional portion to a memory in the computer system and sending the information in the first portion and at least one additional portion of the memory to a display. A method and system in accordance with the present invention allows one to eliminate the resolving step associated with the conventional A-buffer anti-aliasing scheme. Accordingly, it is cost-effective while maintaining image quality at a high level.

16 Claims, 5 Drawing Sheets

100

METHOD FOR EFFICIENTLY RENDERING COLOR INFORMATION FOR A PIXEL IN A COMPUTER SYSTEM

FIELD OF THE INVENTION

The present invention relates generally to an antialiasing scheme for a computer system and more particularly to providing an antialiasing scheme which minimizes memory requirements.

BACKGROUND OF THE INVENTION

Computer systems are utilized extensively to render objects on a display screen. Since such display screens have a finite number of colored dots or "pixels" to express the image, the exact continuous colors of the ideal image are created by displaying pixels whose color has been determined by sampling colors at discrete. As is well known, antialiasing is an approach that can be used to improve the quality of such an image by capturing more information about the color for each pixel. The number and position of these sample points, and the way their color information is combined to make the final display image, affects the perceived quality of the displayed image.

The most common way to sample an image is to take one sample for each final displayed pixel. Although this is adequate for many images, high-contrast edges will often be drawn in crude, jagged "stairsteps". This is the result of treating each pixel as a single sampled point instead of as an area that may be partly covered by one color and partly by another. A much better approach is to compute the color for each pixel by blending the contributions of images that are drawn nearby and weighting the contribution of each such image in accordance with how much of the pixel is covered. This technique is called "antialiasing", because it reduces the "aliasing" effect of under-sampling which results in abrupt changes in the images. There are two common antialiasing techniques.

This first scheme for implementing antialiased image generation is referred to as the "A-buffer" scheme. An A-buffer is used to contain an open-ended list of all the contributions to a pixel. A list of "fragments" is maintained for each drawn object that overlaps the pixel. A "fragment" is the overlap of a drawn object and a pixel, and usually includes the object's color at that location, and optionally its depth or other parameters. When it is time to compute a single color for this pixel so it may be displayed, the list of fragments is examined and all the contributions are blended together to form a single aggregate color for the pixel.

Although many pixels may be completely covered by a single fragment, it is possible for a pixel to have any number of objects partly overlap it and to include many fragments. An A-buffer list for any one pixel may thus have any number of fragments. This is a severe disadvantage for the A-buffer scheme, since such a scheme has unbounded storage and memory bandwidth requirements, and thus adds cost and complexity to the overall system.

The second scheme for implementing antialiased image generation is referred to as the "multisampling" scheme. Multisampling represents the many fragments covering a pixel by sampling at a limited number of points within or near the pixel. The number and position of these points is chosen before rendering begins. By sampling at eight locations, for example, a rough estimate of the color and coverage of a moderate number of fragments can be obtained. To approximate a large number of fragments requires a large number of samples. A multisampling scheme with a very small number of samples (e.g., 2) is ineffective, because such a small number of sample points, chosen without knowledge of where the fragments may be for a particular pixel, are very unlikely to provide an accurate representation of the fragments and especially of their contribution to the pixel. Multisampling has fixed storage requirements because it has a fixed number of samples per pixel, but it is wasteful of storage and memory bandwidth since many pixels may have the same color repeated in each sample.

To implement antialiasing efficiently in computer system requires an approach that limits storage, bandwidth, and complexity requirements, while still providing a reasonable representation of the fragments that cover each pixel. The present invention addresses such a need.

SUMMARY OF THE INVENTION

A method and system for efficiently rendering and displaying color information of a pixel in a computer system is disclosed. Each pixel includes a plurality of fragments. The method and system comprises providing a weighted average of the color information of a plurality of fragments for a pixel to a first portion of a register. The register is within a data structure in the computer system. The method and system also includes providing the color information of pre-selected fragments, except the one with the largest pixel coverage, to at least one additional portion of the register. The method and system further includes sending the register to a memory in the computer system, and sending it subsequently from that memory to a display without further processing.

A method and system in accordance with the present invention allows one to eliminate the resolving step associated with the conventional A-buffer antialiasing scheme and limits the memory, bandwidth and complexity of the system. Accordingly, it is cost-effective while maintaining high image quality.

DETAILED DESCRIPTION

The present invention relates generally to an antialiasing scheme and more particularly to providing an antialiasing scheme that minimizes memory, bandwidth and complexity requirements. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown, but is to be accorded the widest scope consistent with the principles and features described herein.

Figure 1:
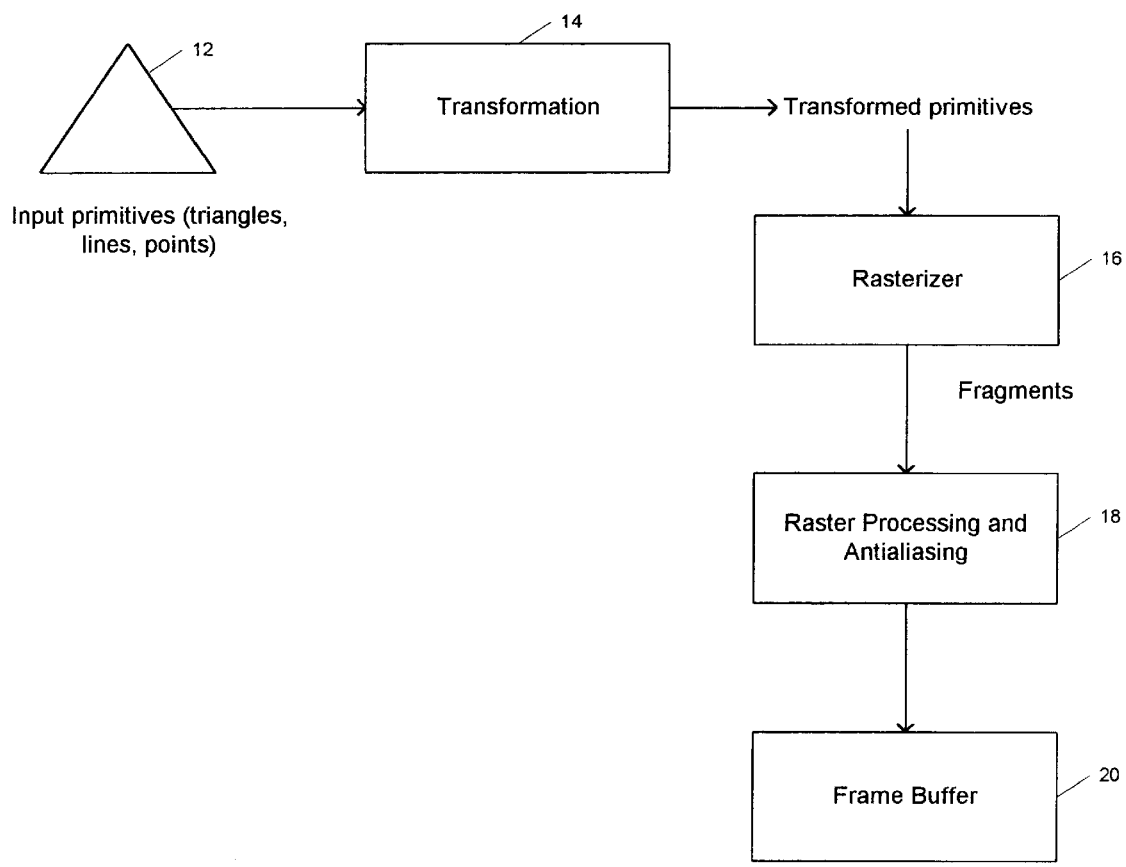
FIG. 1 is a simple high-level block diagram of a system for rendering images.

Computer systems are utilized extensively to render objects on display screens. Typically this rendering is accomplished through operation of a graphics processing system. FIG. 1 is a simple high-level block diagram of a system 10 for rendering images. The system 10 includes a plurality of input primitives 12 (such as triangles, lines and points) which are provided to a transformation block 14. The transformation block 14 converts the input primitives to transformed primitives. These transformed primitives are then provided to a rasterizer 16. The rasterizer 16 provides fragments to a raster processing and antialiasing unit 18. Each fragment typically includes several kinds of information related to an image. For example, a fragment may include color (RGB), opacity (alpha), depth (z, possibly z slopes) and mask coverage information. Each fragment of information is then processed and antialiased in raster processing and antialiasing unit 18. A frame buffer 20 provides data to and receives information from the raster processing and antialiasing unit 18.

Figure 2:
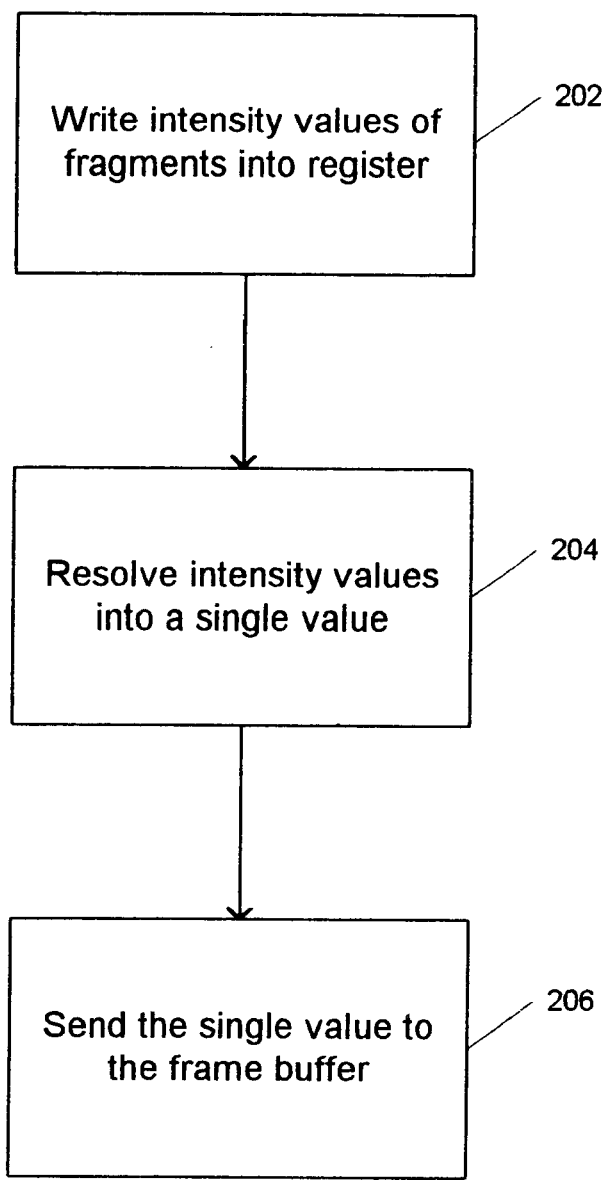
FIG. 2 is a flow chart of a conventional A-buffer antialiasing scheme using an algorithm allocation method.

A conventional A-buffer antialiasing scheme provides a pixel with multiple fragments therewithin to the frame buffer 20 in the following manner. FIG. 2 is a flow chart of a conventional A-buffer antialiasing scheme. First, the color intensity values, and optionally depth or other parameters of the fragments that cover a pixel are written into a list, via step 202. The fragments are written sequentially without foreknowledge of future fragments. If they include depth information, writing is conditional on passing a depth test. If older is fragments are completely obscured by other fragments, they are deleted from the list. Second, the color intensity values of the fragments are resolved into a single value, via step 204. The resolving step is accomplished, using fragment coverage information 56 as shown on FIG. 3. Finally, a single color intensity value is sent to a to a monitor, via step 206.

Figure 4:
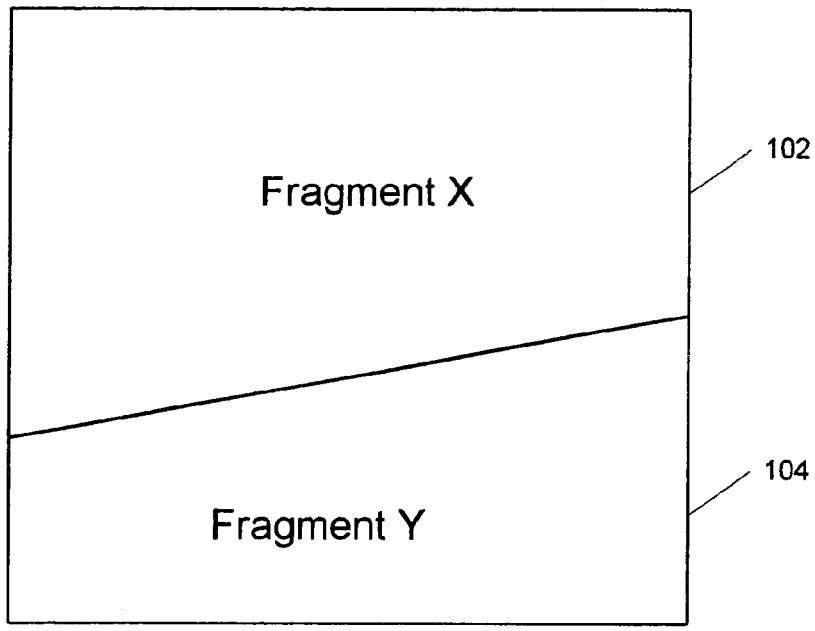
FIG. 4 illustrates a pixel that includes two fragments.

Hence, for a pixel covered by two fragments 100 as shown in FIG. 4, for example, eight bits of color intensity value of R for Fragment X 102 are sent to a register from pixel storage and eight bits of color intensity value of R for Fragment Y 104 are sent to the same register from pixel storage. Pixel storage in a preferred embodiment is the frame buffer.

In addition to recording the color intensity, depth, and/or other parameters for the fragments that are visible within the pixel, the sub-area within the pixel that each covers must be recorded as well. For example, a bit-mask could be used to identify which fragments are visible at which locations within the pixel. The coverage information includes both which portion of the pixel is covered by which fragment, as well as the exact or approximate fractional pixel area for each.

Before the pixels' fragment lists can be read out as colors, such as for display, the rasterizer processing and antialiasing unit 16 processes the fragment lists of the pixels using the coverage information to provide the pixel. Accordingly, these steps increase the overall time required to send pixel information to frame buffer 20 as well as requiring the step of calculating the final color fragment list of each pixel.

To address the storage problems associated with A-buffer algorithms, a fixed fragment A-buffer antialiasing scheme is typically utilized. In a fixed fragment A-buffer antialiasing scheme, a fixed number (e.g., 2, 3 or 4) of fragments can be stored for each pixel. By providing data for a fixed number of fragments it is possible to limit the amount of storage required; however, there is a tradeoff in terms of image quality. Pixels covered by three or more fragments are quite rare and generally occur in visually complex portions of the image so that compromising their representation has little effect on perceived image quality. However, it is still necessary to ensure that when a fixed number of fragments allocation scheme is utilized that the image be of the highest quality permitted by the available storage.

Figure 3:
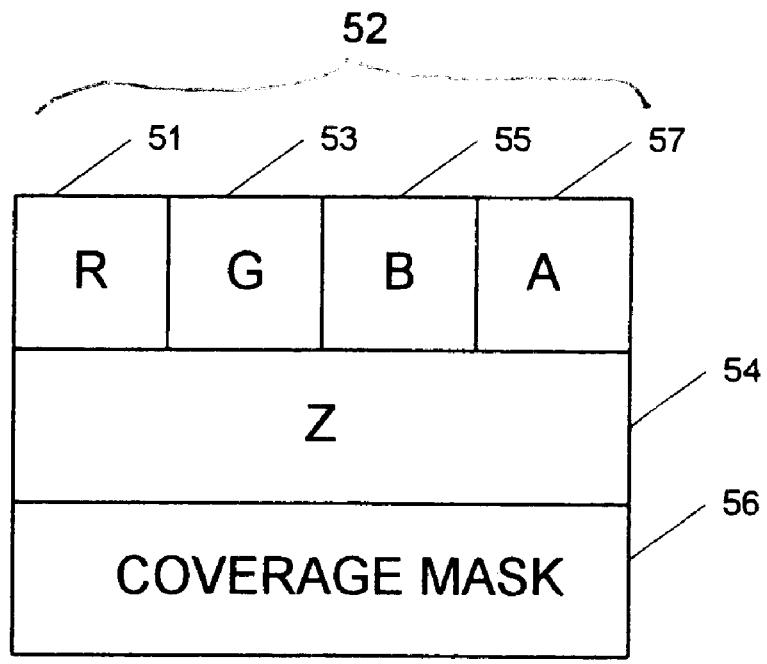
FIG. 3 is a data structure utilized in rendering of a pixel in a graphics system utilizing an A-buffer antialiasing scheme.

The present invention is directed toward providing high image quality images utilizing a fixed fragment A-buffer antialiasing scheme. Before describing the features of the present invention, first a data structure utilized to provide information about a pixel will be described. FIG. 3 is a data structure 50 that is typically utilized to provide information about a pixel. In this example, the pixel is represented by 72 bits. Accordingly, in a preferred embodiment, 32 bits are utilized to represent the Z values 54, a 32 bits are utilized to represent the color intensity information 52 and eight bits are utilized to represent the coverage mask 56. The 32 bits of color intensity information 52 is represented by an eight bit register 51 of red (R), an eight bit register 55 of blue (B), an eight bit register 53 of green (G) and an eight bit register 57 of alpha (A).

Referring now to FIG. 4, what is shown is a pixel 100 that is covered by two fragments, Fragment X 102 and Fragment Y 104. One of ordinary skill in the art readily recognizes that a pixel may be covered by more than two fragments; however for ease of illustration, a two-fragment example is described. Accordingly, in this example, pixel 100 has color intensity values (RGBA) from each of the Fragment X 102 and Fragment Y 104. Accordingly, for each color (RGBA) these intensity values have to be rendered to the frame buffer 20 of FIG. 1. If the intensity value of Fragment X 102 of R has eight bits of information and the intensity value of Fragment Y 104 of R has eight bits of information, the 16 bits of color intensity information related to the Fragments X and Y 102 and 104 have to be reduced to eight bits of information to be provided to register 50 (FIG. 3).

A method and system in accordance with the present invention eliminates the calculation or resolving step associated with the conventional A-buffer antialiasing scheme and therefore reduces the number of bits required to represent the fragment. Accordingly, it is cost-effective while maintaining image quality at a high level. To more clearly describe the features of the present invention, refer now to the following discussion in conjunction with the accompanying figures.

Figure 5:
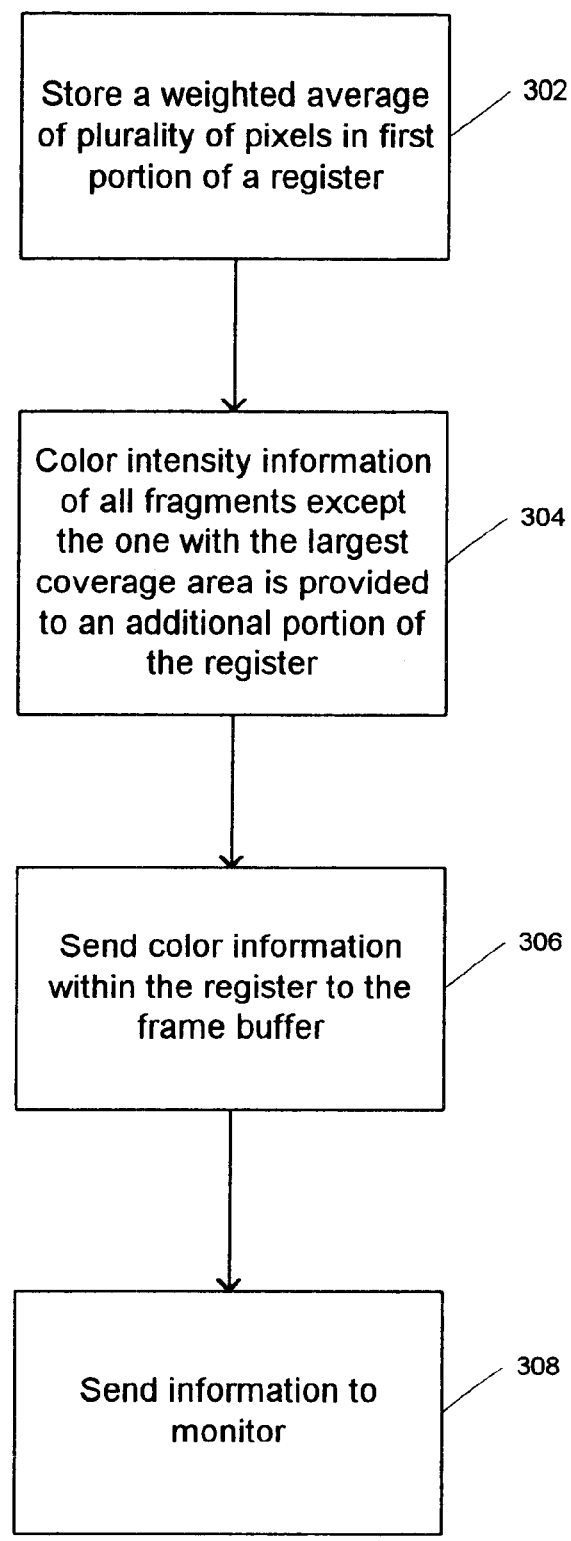
FIG. 5 is a simple flow chart of an A-buffer antialiasing scheme in accordance with the present invention.

FIG. 5 is a simple flow chart of an antialiasing scheme in accordance with the present invention. First, a weighted average of the color intensity information of a plurality of fragments for a pixel is stored in a first portion of a color intensity value register, via step 302. Next, the color intensity information of all fragments, except the one with the largest pixel coverage area is provided to an additional portion of the color intensity value register, via step 304.

For example, if there are two fragments covering a pixel, Fragment A and Fragment B, and assuming Fragment A has greater pixel area coverage than Fragment B, the weighted average of the color intensity information for Fragment A and Fragment B would be provided to a first portion of the color intensity-value register and the color intensity information of Fragment B would be provided in a second portion of the color intensity value register. In a three fragment example (Fragments A, B and C), and assuming Fragment A has greater pixel area coverage than Fragment B, and Fragment B has greater pixel area coverage than Fragment C, the weighted average of the color intensity information for Fragments A, B and C would be provided to a first portion of the color intensity value register, the color intensity information for Fragment B would be provided in a second portion of the color intensity value register and the color intensity information for Fragment C would be provided to a third portion of the color intensity value register. Thereafter, the color intensity value information within the color intensity value register is provided to the frame buffer, via step 306. The information is then sent to the monitor, via step 308.

In so doing, the color intensity value of a pixel can be provided directly to the monitor without any calculation or resolving step because all but the least significant bits of color intensity already expresses the properly weighted average of the contributing fragments. To further describe and illustrate the present invention in the context of a specific example, refer now to the following description. In this example, first the weighted average of the color intensity values of Fragment X 102 and Fragment Y 104 are placed in the upper six bits of the red color intensity value register 510 (step 302). That is, if the weighted average of red intensity information for Fragment X to Fragment Y is 2:1, then the first six bits is the weighted average of the red intensity value of Fragment X 102 and Fragment Y 104, which would be four bits of Fragment X 102 and two bits of Fragment Y 104.

Thereafter, the lower two bits of red intensity information register 51 will contain the two most significant bits (MSBs) of Fragment Y 104, (step 304). The MSBs of Fragment Y 104 are utilized because they typically contain the more important information from pixel to pixel. Thereafter, this eight bit value is provided to the frame buffer-20 (step 306). Accordingly, the data can be read directly from the color intensity value register 50 into the flame buffer 20 because the value is approximately the value that is desired.

Therefore, there is no requirement to resolve the two values via the coverage mask 56. Accordingly, the system and method in accordance with the present invention allows for a more efficient system for providing data to a frame buffer 20 utilizing a fixed number of fragments A-buffer antialiasing system.

In this example, the first six bits have been deemed to be the best based upon the relative weights of red intensity value information in Fragment X 102 and Fragment Y 104. One of ordinary skill in the art recognizes that while register bits can be allocated in several ways, choosing an allocation dynamically based upon the coverage fraction preserves more information than any static allocation. Hence, for example, the weighted average could be between four and eight bits in this eight-bit example, dependent upon the coverage ratios of Fragment X 102 and Fragment Y 104.

In this example, the eight bits of color intensity information are what is desired without the need for further calculation and therefore these eight bits can be sent directly to monitor without requiring a resolving step. Accordingly, there is no need to read the mask bits at that time. The upper bit or bits of Fragment Y 104 generally change more slowly from pixel to pixel than the lower bits, and so their contribution to the displayed color might be perceived as slight bands of color. By reversing the bits, the more-rapidly changing lower bits take their place, making the slight color change occur over short distances, which may be perceived as slight noise. Noise is generally considered a less objectionable flaw than banding in a displayed image. In a preferred embodiment, the two bits of Fragment Y 104 in the red value intensity register 510 are bit reversed in an attempt to change the image artifact from banding to noise for the image.

Accordingly, as has been above mentioned, the register 50 can be of any size, the key feature being that a weighted average value is provided to the register 50 to provide a close indication of the exact color intensity values of the plurality of pixels. As has also been before mentioned, although it is important to limit the amount of storage required by utilizing a pre-selected number of fragments allocation scheme, the maximum number of fragments allowed per pixel can be any number. Hence, this system may be utilized in a A-buffering antialiasing scheme where there are any number (such as 2, 3 or 4) fragments per pixel and as long as the weighted average of the red intensity of all the fragments is placed in a first portion of the red intensity value register 51 and the red intensities of all fragments except the one with the greatest coverage are placed in the second portion of the register 51.

Although the present invention has been described in accordance with the embodiments shown, one of ordinary skill in the art will readily recognize that there could be variations to the embodiments and those variations would be within the spirit and scope of the present invention. For example, although the example has been described in the context of the red intensity register (register 51), one of ordinary skill in the art readily recognizes that a system and method in accordance with the present invention is also utilized advantageously with green (G) register 53, blue (B) register 55 and alpha register 57 to allow intensity information from pixels covered by more than one fragment to be provided to the frame buffer 20 more efficiently. Accordingly, many modifications may be made by one of ordinary skill in the art without departing from the spirit and scope of the appended claims.

What is claimed is:

1. A method for efficiently rendering and displaying color intensity information of pixels in a computer system, the pixels including a plurality of fragments, the method comprising the steps of:
   (a) providing a weighted average of color intensity information of a plurality of fragments for a pixel to a first portion of a register;
   (b) providing the color intensity information for a pre-selected number of fragments of a pixel, except the one with the largest coverage to at least one additional portion of the register;
   (c) sending the information in the first portion and the at least one additional portion of the register to a memory in a computer system; and
   (d) sending the information in the first portion and the at least one additional portion of the memory to a display.

2. The method of claim 1 in which the first portion of the color intensity information for a fragment provided to the register comprises the most significant bits (MSBs) of the register.

3. The method of claim 1 in which the color intensity information comprises red (R) intensity information.

4. The method of claim 1 in which the color intensity information comprises green (G) intensity information.

5. The method of claim 1 in which the color intensity information comprises blue (B) intensity information.

6. The method of claim 1 in which the color intensity information comprises alpha (A) intensity information.

7. The method of claim 2 in which the additional portion comprises the least significant bits of the register.

8. The method of claim 7 in which the least significant bits are bit reversed in the register.

9. A system for efficiently rendering color intensity information of a pixel in a computer system, the pixel including a plurality of fragments, the system comprising:

means for providing a weighted average of color intensity information of a plurality of fragments for a pixel to a first portion of a register;

means for providing color intensity information of a pre-selected number of fragments that cover a pixel, except the one with the largest coverage to at least one additional portion of the register;

means for sending the information in the first portion and the at least one additional portion to a memory in a computer system; and means for sending the information in the first and at least one additional portions of the memory to a display.

10. The system of claim 9 in which the first portion comprises the most significant bits (MSBs) of the register.

11. The system of claim 9 in which the color intensity information comprises red (R) intensity information.

12. The system of claim 9 in which the color intensity information comprises green (G) intensity information.

13. The system of claim 9 in which the color intensity information comprises blue (B) intensity information.

14. The system of claim 9 in which the color intensity information comprises alpha (A) intensity information.

15. The system of claim 10 in which the additional portion comprises the least significant bits of the register.

16. The system of claim 15 in which the least significant bits are bit reversed in the register.

* * * * *